United States Patent
Okamoto et al.

(10) Patent No.: US 7,277,207 B2
(45) Date of Patent: Oct. 2, 2007

(54) RECORDING DEVICE

(75) Inventors: Yoshinari Okamoto, Toyoake (JP); Makoto Suzuki, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 814 days.

(21) Appl. No.: 10/200,212

(22) Filed: Jul. 23, 2002

(65) Prior Publication Data
US 2003/0020967 A1   Jan. 30, 2003

(30) Foreign Application Priority Data
Jul. 24, 2001   (JP) .......................... P2001-223505

(51) Int. Cl.
*H04N 1/04* (2006.01)
(52) U.S. Cl. ...................... 358/486; 358/1.5; 358/1.12; 358/1.16; 358/1.17; 358/1.18; 358/404; 358/412; 358/444; 358/448; 358/498
(58) Field of Classification Search ................ 358/296, 358/400, 486, 1.5, 1.12, 1.16, 1.17, 1.18, 358/404, 412, 444, 448, 498
See application file for complete search history.

(56) References Cited

U.S. PATENT DOCUMENTS 4,970,599 A * 11/1990 Nobuta ....................... 358/296
5,107,344 A * 4/1992 Nosaki et al. ............... 358/401
5,668,637 A * 9/1997 Yamaguchi .................. 358/296
6,499,733 B1 * 12/2002 Oberhoffner et al. ..... 271/10.03
2001/0033394 A1 * 10/2001 Ishikawa et al. ............ 358/401

* cited by examiner

*Primary Examiner*—Twyler Lamb
*Assistant Examiner*—Vu B. Hang
(74) *Attorney, Agent, or Firm*—Oliff & Berridge, PLC

(57) ABSTRACT

A recording device includes an image retrieval unit, a memory, an image forming unit, and a control unit. The image retrieval unit retrieves images of the document pages as document image data. The control unit begins retrieving document image data from the memory as the image retrieval unit is retrieving document image data and sends the document image data to the image forming unit. The image forming unit uses document image data to form images on recording sheets faster than the image data is retrieved. The control unit checks the memory to confirm whether document image data for a next document page is stored in the memory. The timing of the memory check is both after completion of forming an image of a present document page at the recording sheet transport speed and when storage of image data for the next document page is anticipated to start in the memory.

13 Claims, 8 Drawing Sheets

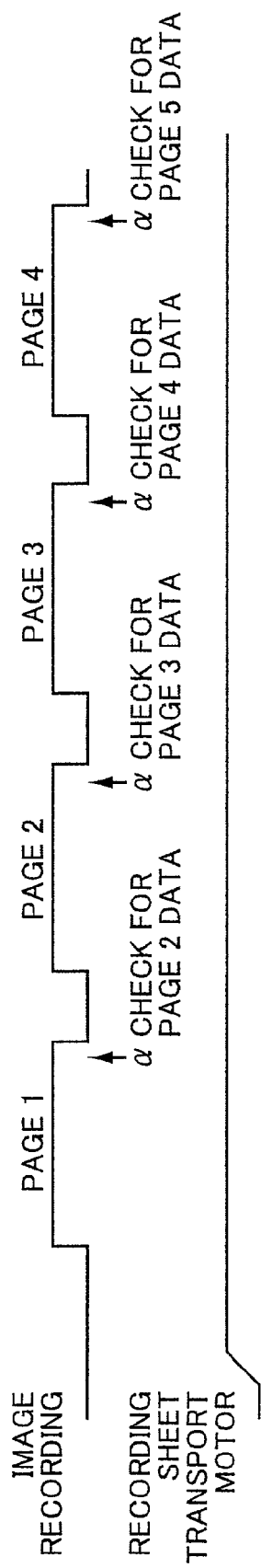
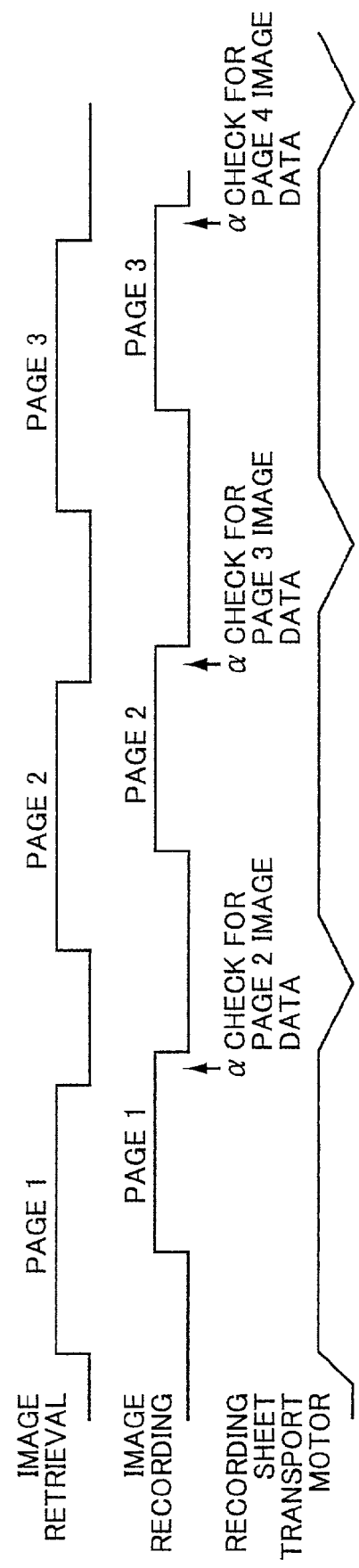

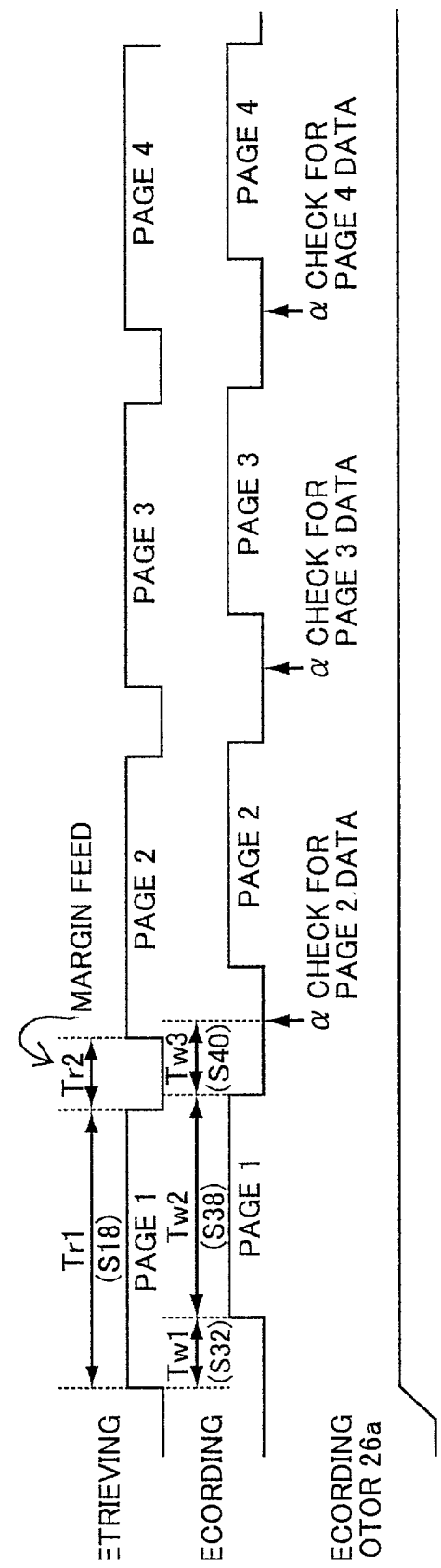

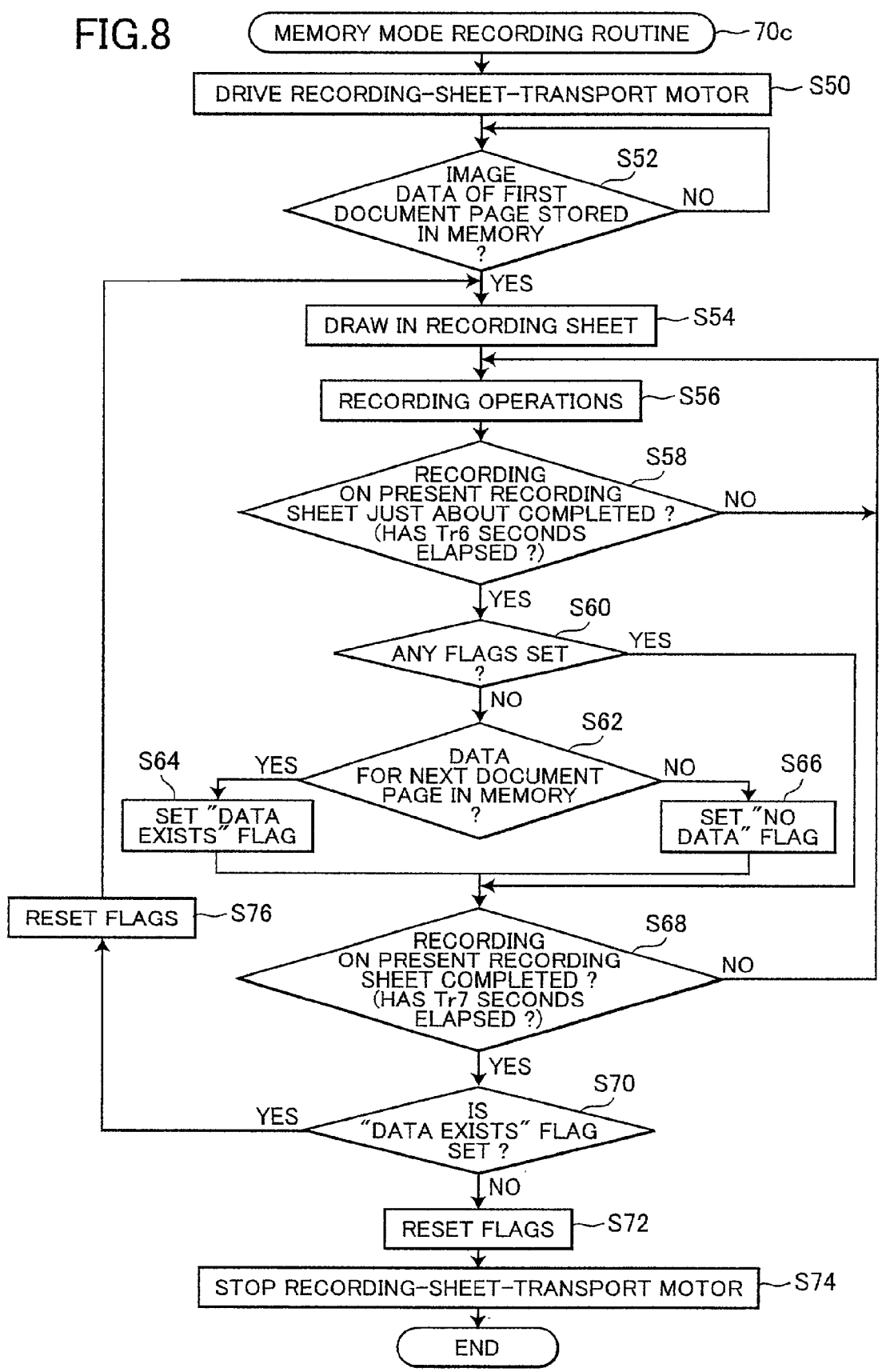

RECORDING DEVICE

BACKGROUND OF THE INVENTION

1. Field of the Invention

The present invention relates to a recording device with a copy function.

2. Description of the Related Art

Recently, multifunction facsimile machines that include an electrostatic recording device have become popular. Some multifunction facsimile machines include a printer function and two copy functions. The printer function is for printing out images based on data from an external device, such as a personal computer. The copy functions include a simultaneous retrieval/recording mode copy function and a memory mode copy function.

In the simultaneous retrieval/recording mode, a scanner retrieves image data representing an image of a document. As the image data is being temporarily stored in a memory, a recording unit retrieves the image data from the memory and uses it to print out images of the document. Because the image data is not compressed before being stored in the memory, printing can be rapidly performed. Therefore, the simultaneous retrieval/recording mode is well suited for copying documents quickly.

In the memory mode, image data from the scanner is compressed and stored one page at a time in a memory. Once image data for an entire page of document is stored in memory, the image data is retrieved, decompressed, and used by the recording unit to print out document images. The memory mode is well suited for recording the same image on a plurality of recording sheets using the same compressed data stored in memory.

During the memory mode, a conventional multifunctional facsimile machine follows the timing represented in the timing chart of FIG. 1(a) to consecutively print images at the recording device's maximum speed. That is, before the page that is being presently printed is completely printed out, the memory is checked a timing α to see if image data of the next page to be printed out is stored in the memory. If the memory holds the image data for a subsequent page of images, then the data is retrieved and used for recording the image.

FIG. 1(b) shows the memory check timing used in the memory mode applied in the simultaneous retrieval/recording mode. Because recording units can usually record pages faster than scanners can retrieve images of pages, if the memory is checked at timing a directly before the recording unit records a page worth of image data, then the scanner will not have started retrieving the image data of the next page, so the check will result in a determination that no subsequent document page needs to be printed.

In order to improve durability of facsimile machines, copy machines, and printers, it is desirable to stop transport components, such as a recording sheet transport motor for driving transport rollers for transporting the recording sheets, during times when printing is not being performed. In the situation depicted in FIG. 1(b), the recording sheet transport motor is stopped each time a page of document is printed because no image data for subsequent pages was found to be stored in the memory. Once the image data for a subsequent page is confirmed in the memory, the recording sheet transport motor is started up again.

SUMMARY OF THE PRESENT INVENTION

However, once stopped it takes time for the recording sheet transport motor and other components to achieve a proper operating speed. Therefore, copy operations are slowed down by the time it takes to start up the motor and other components to proper speed.

In order to overcome this potential problem, it is conceivable to speed up the retrieval speed of the scanner. However, retrieval speed is limited by processing capability of image elements, such as CCDs. Therefore, improvements in retrieval speed of scanners have not kept up with improvements in recording speed.

It is an objective of the present invention to provide a multifunction recording device capable of smoothly copying when images are formed while documents are retrieved.

In order to achieve the above-described objectives, a recording device according to the present invention includes an image retrieval unit, a memory, an image forming unit, and a control unit. The image retrieval unit transports document pages one at a time at an image retrieval speed while retrieving images of the document pages as document image data. The memory stores the document image data retrieved by the image retrieval unit. The image forming unit transports recording sheets at a recording sheet transport speed that is faster than the image retrieval speed, while forming images on the recording sheets using document image data that was retrieved by the image retrieval unit and stored in the memory. The control unit begins retrieving document image data of a document page from the memory as the image retrieval unit is retrieving document image data of the document page and sends the document image data to the image forming unit. The control unit checks the memory to confirm whether document image data for a next document page is stored in the memory. The timing of the memory check is both after the image forming unit completes forming an image of a present document page at the recording sheet transport speed and when storage of image data retrieved by the image retrieval unit for the next document page is anticipated to start in the memory.

According to another aspect of the present invention, a recording device with a copy function includes a document transport unit, an image retrieval unit, a reception unit, a memory unit, a recording sheet transport unit, an image forming unit, a mode switching unit, a check unit, and a transport control unit.

The document transport unit successively transports document pages one sheet at a time along a document transport pathway at a document page transport speed.

The image retrieval unit retrieves images of the document pages transported successively by the document transport unit as document image data.

The reception unit receives document image data from an external source.

The memory unit stores the document image data received by the reception unit and document image data retrieved by the image retrieval unit into a memory;

The recording sheet transport unit transports recording sheets along a recording sheet transport pathway at a recording sheet transport speed that is faster than the document page transport speed.

The image forming unit, based on document image data stored in the memory, forms images onto recording sheets transported by the recording sheet transport unit.

The mode switching unit selectively switches between a memory mode and a simultaneous retrieval/recording mode.

In the memory mode, the memory unit compresses and stores document image data retrieved by the image retrieval unit and received by the reception unit for each document page in the memory before outputting the image data for the document page to the image forming unit. The image forming unit then records images on the recording sheet based on the document image data. In the simultaneous retrieval/recording mode, in order to record images on the recording sheet while retrieving images using the image retrieval unit, the memory unit stores, in the memory, the document image data retrieved for a document page by the image retrieval unit while outputting the document image data for the document page in the memory to the image forming unit.

The check unit checks whether document image data for recording an image on a next recording sheet is stored in the memory. The check unit checks the memory at a timing that is both before the image forming unit completes recording an image on a present recording sheet during the memory mode and when the memory unit is anticipated to start storing, in the memory, image data retrieved by the image retrieval unit for the next document page during the simultaneous retrieval/recording mode.

The transport control unit stops the recording sheet transport unit when the check unit judges that the memory does not store document image data of the next document page and continues operation of the recording sheet transport unit to transport the next recording sheet when the check unit judges that the memory stores document image data of the next document page.

BRIEF DESCRIPTION OF THE DRAWINGS

The above and other objects, features and advantages of the invention will become more apparent from reading the following description of the embodiment taken in connection with the accompanying drawings in which:

FIG. 1(a) is a timing chart representing timing at which memory is checked for image data in a conventional recording device;

FIG. 1(b) is a timing chart representing timing a which memory is checked for image data in a conceivable recording device;

FIG. 7 is a timing chart representing timing of operations performed during the simultaneous retrieval/recording mode routine; and FIG. 8 is a flowchart representing a memory mode routine.

DETAILED DESCRIPTION OF THE EMBODIMENT

Next, a facsimile machine 2 according to an embodiment of the present invention will be described. The facsimile machine 2 includes a facsimile function, a printer function, and a copy function. The facsimile function enables the facsimile machine 2 to function as a facsimile machine to retrieve images from documents in the form of image data and transmit the image data over a telephone line as facsimile data (referred to alternately as fax data hereinafter) to a remote facsimile machine, and also to receive facsimile data that was transmitted over a telephone line from a remote facsimile machine and form images on recording sheets based on the received facsimile data.

The printer function enables the facsimile machine 2 to function as a printer to receive code data (referred to alternately as PC data hereinafter) that was transmitted over a printer cable from a personal computer or a word processor, for example, and to form images that correspond to the PC data on recording sheets.

The copy function enables the facsimile machine 2 to function as a copy machine to retrieve images from documents as image data and form copies of the documents on recording sheets based on the image data.

Figure 2:
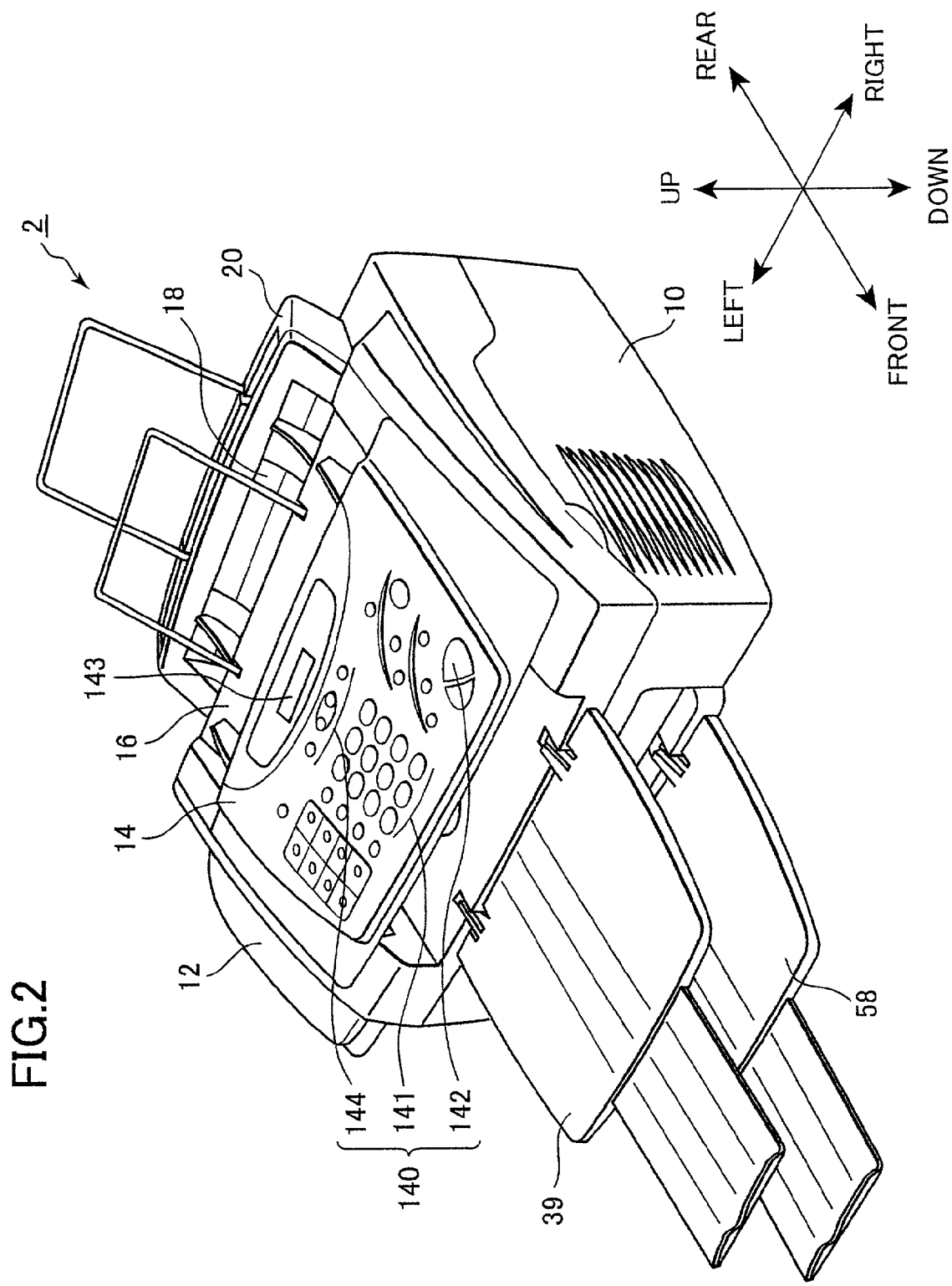
FIG. 2 is a perspective view showing external configuration of a facsimile machine according to an embodiment of the present invention.

The external configuration of the facsimile machine 2 will be described with reference to FIG. 2. As shown in FIG. 2, the facsimile machine 2 includes a main casing 10, an operation panel 14, a handset 12, and trays 16, 18, 20, 39, and 58.

The document-supply tray 16, the manual sheet-supply tray 18, and the first sheet-supply tray 20 are provided at the upper rear of the main casing 10 in this order from frontmost to rearmost. The manual sheet-supply tray 18 is provided at a position higher than the automatic sheet-supply tray 20, and the document-supply tray 16 is provided at a position higher than the manual sheet-supply tray 18. The manual sheet-supply tray 18 is used when recording sheets are to be manually fed into the facsimile machine 2.

The operation panel 14 is provided at the upper front of the main casing 10. The operation panel 14 includes a variety of keys 140 and a liquid crystal display (LCD) 143. The keys 140 include numeric keys 141 used to input the FAX number of a remote facsimile machine, a start button 142, and a mode selection button 144. The mode selection button 144 is for switching between different modes of the facsimile machine 2. Examples of modes that can be set by the mode selection button 144 include a memory mode and a simultaneous retrieval/recording mode. In the memory mode, image data that is retrieved by the scanner portion 22 is first compressed in page units and then stored in the memory 71. When a page is to be printed out, the corresponding compressed data is decompressed and sent to the recording portion 26 as image data for image formation. On the other hand, in the simultaneous retrieval/recording mode, image data that is retrieved by the scanner portion 22 is stored in the memory 71 as it is output to the recording portion 26 for image formation, without being compressed first. The simultaneous retrieval/recording mode can also be referred to as a single mode, because it is used to print out single copies of a document. The LCD 143 is for displaying information relating to a variety of functions of the facsimile machine 2. The handset 12 is attached to the main casing 10 at the left of the operation panel 14.

The document-sheet-discharge tray 39 and the recording-sheet-discharge tray 58 are provided at the front end of the main casing 10.

Next, the internal configuration of the facsimile machine 2 will be described while referring to FIG. 3. The main casing 10 houses a scanner portion 22, a recording portion 26, and a control portion 70.

The scanner portion 22 is for retrieving images from documents. The scanner portion 22 includes a document-supply mechanism 31, document-transport rollers 33, an image retrieval unit 35, document-discharge rollers 36, a document front sensor 37, a document end sensor 38, and the document-sheet-discharge tray 39. The document-supply mechanism 31 includes a document-supply roller 31a and a separation pad 31b for drawing in one sheet at a time of documents stacked on the document-supply tray 16. The document-transport rollers 33 transport documents toward the image retrieval unit 35. The document front sensor 37 is for detecting the front edge of documents transported to the image retrieval unit 35 and the document end sensor 38 is for detecting the rear edge of documents transported out from the image retrieval unit 35. The retrieval unit 35 retrieves image data corresponding to the image on each document based on the detection of the document front sensor 37 and the document end sensor 38. After the image retrieval unit 35 retrieves image data of a document, the document-discharge rollers 36 transport the document to the document-sheet-discharge tray 39.

The recording portion 26 is configured in the manner of laser printer and forms toner images on recording sheets in accordance with commands from the control portion 70. The recording portion 26 includes a sheet-supply mechanism 51, recording-sheet-transport rollers 53, an image forming unit 55, a fixing unit 40, recording-sheet-discharge rollers 57, and a recording-sheet-discharge tray 58. The sheet-supply mechanism 51 includes a recording-sheet-supply roller 51a and a separation pad 51b for drawing in recording sheets stacked on the manual sheet-supply tray 18 one sheet at a time. The recording-sheet-transport rollers 53 transport the recording sheets to the image forming unit 55. The image forming unit 55 forms images on the recording sheets using toner. The fixing unit 40 is disposed downstream from the image forming unit 55 with respect to direction of sheet transport. The fixing unit 40 fixes images onto recording sheets that are transported from the image forming unit 55. The recording-sheet-discharge rollers 57 transport the recording sheets onto the recording-sheet-discharge tray 58.

The image forming unit 55 includes a photosensitive drum 61, a laser light scan unit 62, a developing unit 63, a transfer roller 64, and a toner tank 65. The laser light scan unit 62 includes a polygon mirror rotated by the third motor 26b. The laser light scan unit 62 irradiates the surface of the photosensitive drum 61 with laser light to form a latent electrostatic image on the surface of the photosensitive drum 61. The toner tank 65 stores toner. The developing unit 63 supplies toner from the toner tank 65 to the surface of the photosensitive drum 61 to develop the latent electrostatic image on the surface of the photosensitive drum 61 into a visible toner image. The transfer roller 64 transfers the visible toner image from the photosensitive drum 61 onto a recording sheet transported by the recording-sheet-transport rollers 53. The laser light scan unit 62 includes a laser light emitting portion 67, a laser reflecting lens 68, and a reflecting mirror 69. The reflecting mirror 69 is for guiding laser light reflected by the lens 68 to the photosensitive drum 61.

Figure 4:
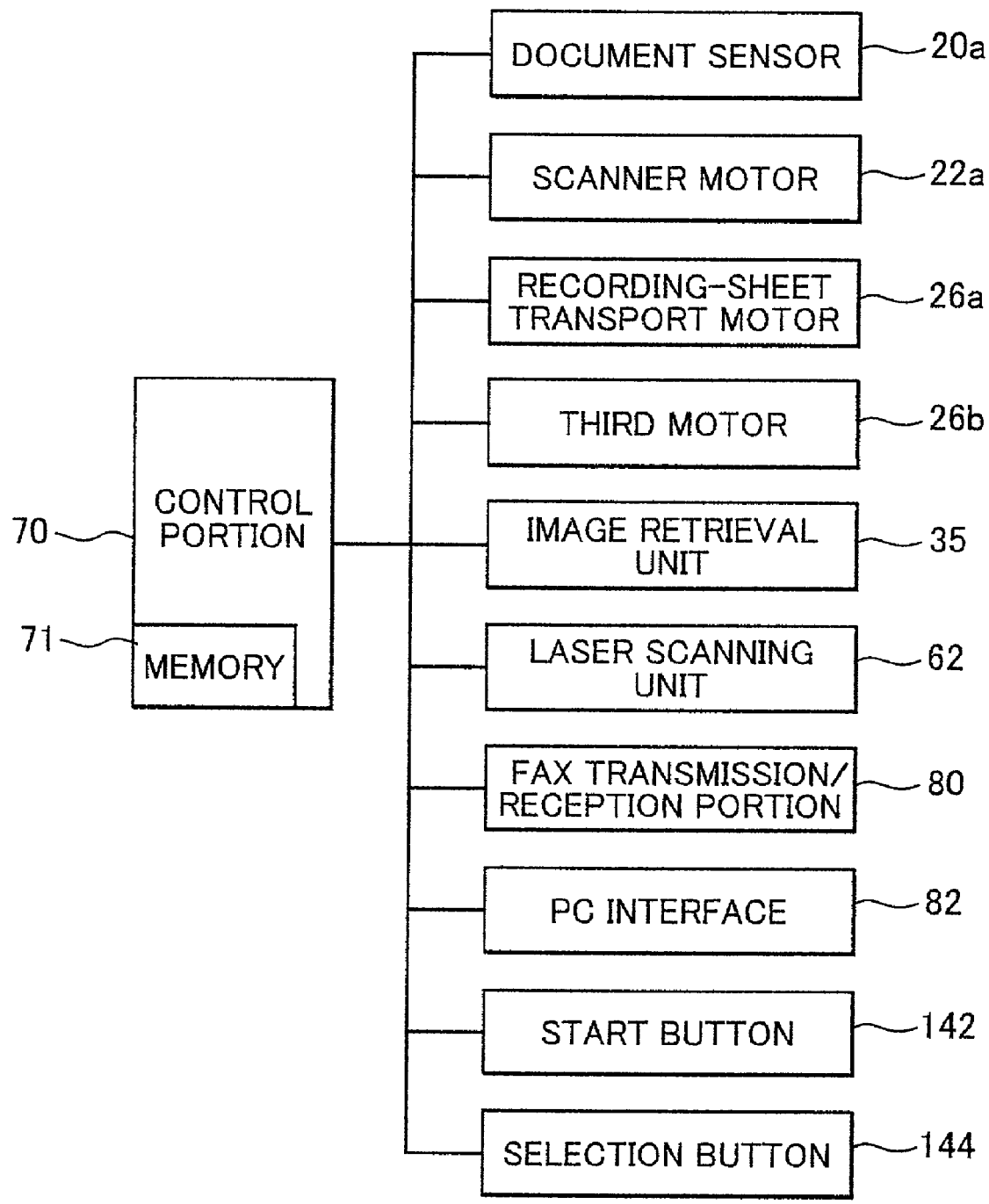
FIG. 4 is a block diagram showing electrical components of the facsimile machine in FIG. 2.
Figure 5:
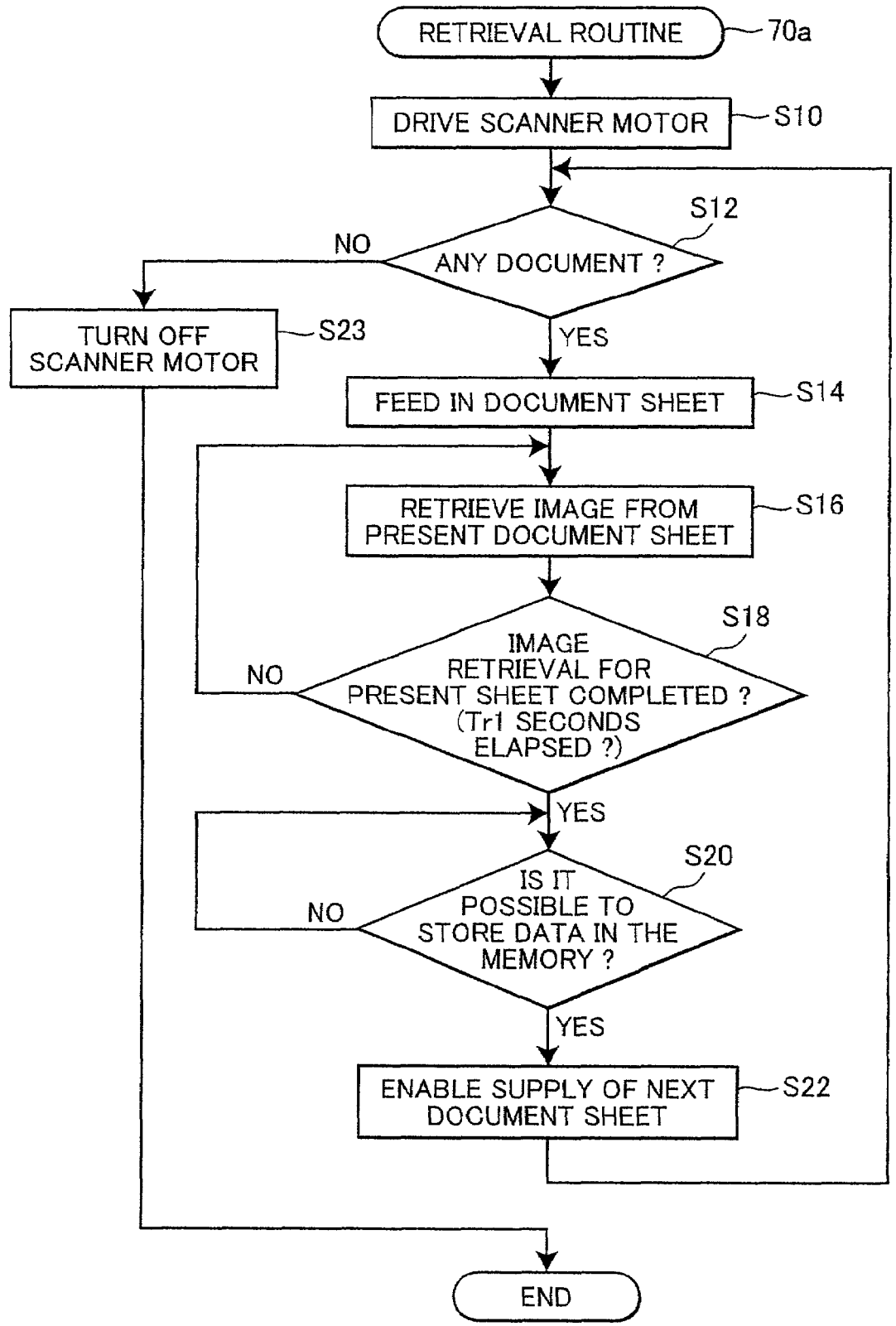
FIG. 5 is a flowchart representing a retrieval routine.

The control portion 70 is for controlling drive of the scanner portion 22 and the recording portion 26 and performing various processes to be described later. As shown in FIG. 4, the control portion 70 includes a memory 71 for storing image data. Also, the control portion 70 is connected to the image retrieval unit 35, the laser light scan unit 62, the start button 142, and the mode selection button 144.

The facsimile machine 2 further includes a document sensor 20a, a scanner motor 22a, a recording-sheet-transport motor 26a, a third motor 26b, an transmission/reception portion 80, and an interface 82, also all connected to the control portion 70.

The document sensor 20a is attached to the document-supply tray 16 and detects whether or not a document is present on the document-supply tray 16. The scanner motor 22a is the motor for the scanner portion 22 and is connected to the document-supply roller 31a, the document-transport rollers 33, and the document-discharge rollers 36 by gears (not shown). Therefore, the scanner motor 22a and the document-supply roller 31a operate in linked association. When the control portion 70 outputs a document-supply command, the scanner motor 22a drives the document-supply roller 31a to rotate and draw in a document one sheet at a time and supply the document sheets to the document-transport rollers 33. Further, when the scanner motor 22a is driven to operate in accordance with processes performed by the control portion 70, the document-transport rollers 33 transport the document sheets from the document-supply roller 31a, along a document-sheet transport pathway indicated in single-dot chain line in FIG. 3, to the document-sheet-discharge tray 39.

Figure 3:
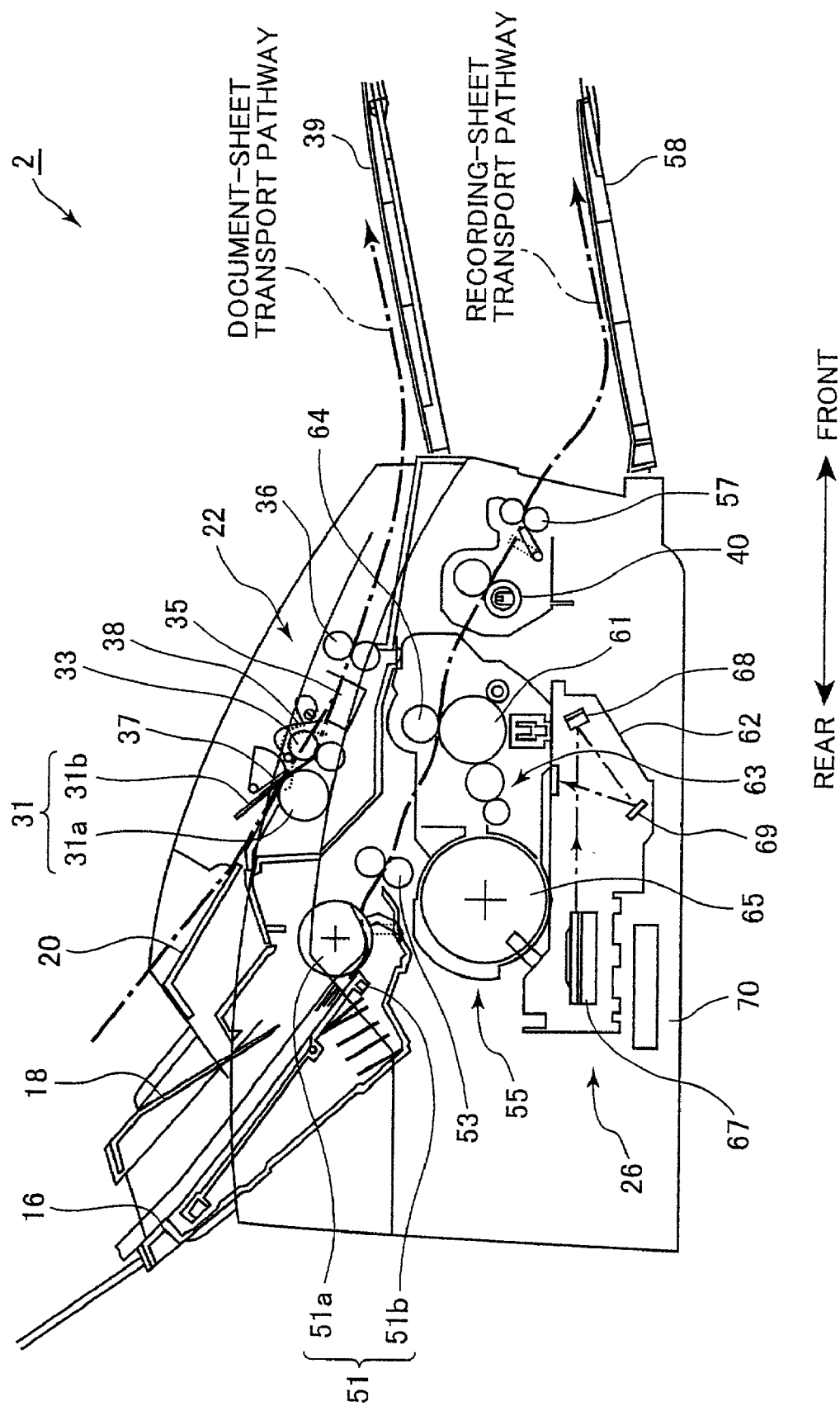
FIG. 3 is a cross-sectional view showing internal configuration of the facsimile machine of FIG. 2.

The recording-sheet-transport motor 26a serves as the power source for the various components disposed along the recording-sheet transport pathway indicated by single-dot chain line in FIG. 3, and is connected to the recording-sheet-supply roller 51, the recording-sheet-transport rollers 53, and the recording-sheet-discharge rollers 57 by gears (not shown) and is further linked to components of the image forming unit 55, such as the fixing unit 40, the photosensitive drum 61, and the transfer roller 64. That is, the recording-sheet-transport motor 26a and the recording-sheet-supply roller 51 operate in linked association so that when the control portion 70 outputs a sheet-supply command, the recording-sheet-transport motor 26a drives the recording-sheet-supply roller 51 to rotate, draw in a recording sheet from the manual sheet-supply tray 18 or the automatic sheet-supply tray 20, and supply the recording sheet to the recording-sheet-transport rollers 53. When the recording-sheet-transport motor 26a is driven to operate in accordance with processes of the control portion 70, the recording-sheet-transport rollers 53 and the recording-sheet-discharge rollers 57 transport the recording sheets drawn in by the recording-sheet-supply roller 51 along a recording-sheet transport pathway and to the recording-sheet-discharge tray 58. During this time, the control portion 70 controls the laser light scan unit 62 to irradiate the photosensitive drum 61 with laser light to form a latent electrostatic image on the photosensitive drum 61. The image forming unit 55 develops the latent electrostatic image into a toner image, transfers the toner images onto the recording sheets, and melts and fixes the toner images onto the recording sheets.

The transmission/reception portion 80 is for transmitting and receiving fax data from a remote facsimile machine (not shown). The interface 82 receives image data from a personal computer (not shown). The control portion 70 is connected to the transmission/reception portion 80 and the interface 82 so as to be capable of transmitting to and receiving data from the transmission/reception portion 80 and the interface 82. The control portion 70 controls the transmission/reception portion 80 and the interface 82 to receive data in amounts that correspond to the empty area in the memory 71, and stores the data in the memory 71. Once more empty area is generated in the memory 71, then the control portion 70 controls to receive that much more data.

Next, various processes performed by the control portion 70 will be described while referring to FIGS. 5 to 8. A retrieval routine 70a is started when the start button 142 is pressed. First, the scanner motor 22a is driven in S10. Then, whether or not a document is mounted on the document-supply tray 16 is judged in S12 based on the readings from the document sensor 20a. If so (S12: YES), then the document-supply roller 31a is driven in S14 to draw in the document one sheet at a time. Once a document sheet is transported along the document-sheet transport pathway to the image retrieval unit 35, then in S16 the image retrieval unit 35 retrieves the image of the document and stores the corresponding image data in the memory 71. It should be noted that while the facsimile machine 2 is in the simultaneous retrieval/recording mode, then the image data retrieved in S16 is stored in the memory 71 as it is output for recording operations. Although during the memory mode the image data retrieved in S16 is also stored in the memory 71, image data is compressed and stored in page units in the memory 71 before printing operations are performed.

While image data of a document page is being retrieved in S16, the control portion 70 determines whether the scanner portion 22 has completed image data retrieval for that document page. This determination is made in S18 by judging whether Tr1 seconds has elapsed since the start of image retrieval. The time duration of Tr1 seconds is determined by dividing the length of the document by the speed at which the document is transported along the document-sheet transport pathway. In the present example, the document is an A4-sized sheet, and so has a length of 294 mm, and document sheets are transported at 11 pages per minute (ppm). Therefore, in the present example, TR1 seconds is 5.4 seconds. Image data retrieval is continued in S16 until it is judged that TR1 seconds has elapsed.

Once it is judged that TR1 seconds has elapsed (S18: YES), then whether or not the memory 71 can hold the next page's worth of image data is judged in S20 by checking the empty area of the memory 71. If insufficient empty area is available in the memory 71 (S20: NO), then S20 is repeated. Once sufficient empty area is available in the memory 71 (S20: YES), then supply of the next document sheet is enabled in S22. Then, the processes in S12 to S22 are repeated until no more document sheets are left on the document-supply tray 16 (S12: NO), whereupon the scanner motor 22a is turned off in S23 and the retrieval routine 70a ends.

Figure 6:
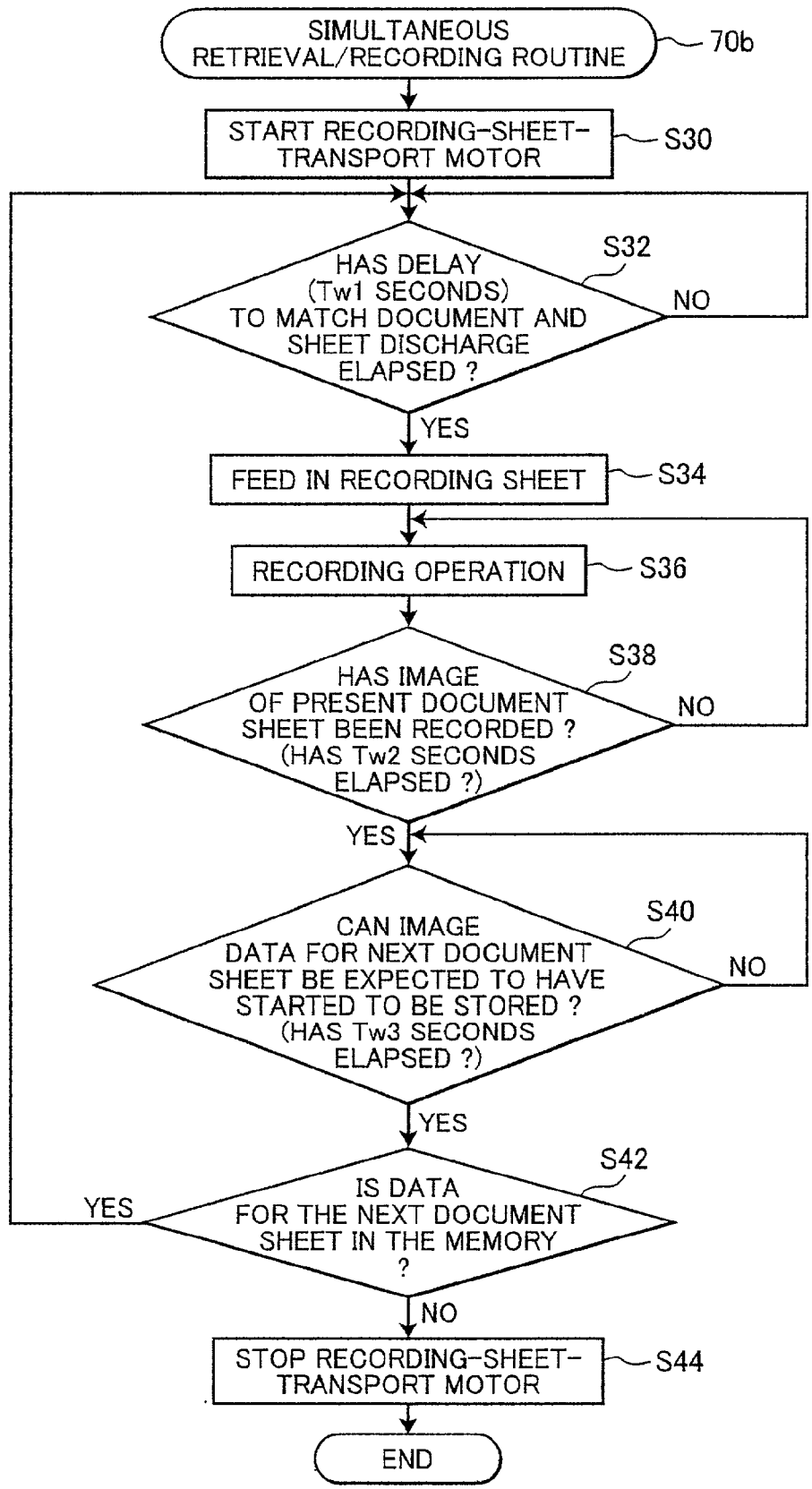
FIG. 6 is a flowchart representing a simultaneous retrieval/recording mode routine.

Next, a simultaneous retrieval/recording mode routine 70b will be described with reference to the flowchart in FIG. 6. If the mode selection button 144 is set to the simultaneous retrieval/recording mode when the start button 142 is turned ON, then the recording-sheet-transport motor 26a is started up in S30. Next, it is judged in S32 whether or not a delay time of Tw1 seconds (shown graphically in FIG. 7) has elapsed since the start of image retrieval by the image retrieval unit 35. Recording sheets are transported at a higher speed than document sheets, because the recording portion 26 can record pages faster than the scanner portion 22 can retrieve images of pages. Therefore, the simultaneous retrieval/recording mode routine 70b delays the start of recording sheet transport by Tw1 seconds in S32 in order to match the timing of document discharge and recording sheet discharge. Once Tw1 seconds has elapsed (S32: YES), then the recording-sheet-supply roller 51 is driven to draw in a recording sheet in S34. After S34, the recording portion 26 is operated in S36 to form images on the recording sheet.

While recording operations are being performed in S36, it is determined whether the recording portion 26 has completed forming an image on the present recording sheet at a maximum speed of the recording portion 26. This determination is made by judging in S38 whether or not Tw2 seconds (shown graphically in FIG. 7) has elapsed since the start of recording operations. The time duration Tw2 seconds of S38 is determined by dividing the length of the recording sheet by the speed at which the recording sheet is transported along the recording-sheet transport pathway. In the present example, the recording sheets are A4-sized sheets with a length of 294 mm and are transported at a speed of 14 pages per minute (ppm). Therefore, Tw2 seconds is 3.5 seconds. Recording operations are performed in S36 until Tw2 seconds elapses.

Once Tw2 seconds elapses (S38: YES), then it is judged in S40 whether or not it can be anticipated that image data retrieved by the image retrieval unit 35 for the next document sheet has started being stored in the memory 71. The judgment of S40 is determined by judging whether a time duration of Tw3 seconds (shown graphically in FIG. 7) has elapsed. The time duration of Tw3 seconds is the time from when the time duration of Tw2 seconds elapses to a next page data check time α. In the present embodiment, the time duration of Tw3 seconds is set to slightly longer than a time duration of Tr2 seconds (shown graphically in FIG. 7). The time duration of Tr2 seconds is the time required to transport a document sheet at the document-sheet transport speed by a distance equivalent to a 50 mm margin from the front edge of the document. Image retrieval is not performed for the margin because images are usually not formed to the very edge of document sheets.

Once Tw3 seconds elapse (S40: YES), then it is judged in S42 whether the retrieval routine 70a was performed for a subsequent document and image data of the subsequent document is stored in the memory 71 as a result. If no data for a subsequent page is stored in the memory 71 (S42: NO), then in S44 the recording-sheet-transport motor 26a is stopped and the simultaneous retrieval/recording mode routine 70b ends. On the other hand, if image data of a subsequent document is stored in the memory 71 (S42: YES), then the processes of S32 to S42 are repeated.

Next, processes performed in the memory mode will be explained. A memory mode routine 70c represented by the flowchart of FIG. 8 is started in three situations, that is, if the mode selection button 144 is set to the memory mode when the start button 142 is turned ON, if the transmission/reception portion 80 receives fax data, or if the interface 82 receives image data from a personal computer. When the memory mode routine 70c is started, the second motor recording-sheet-transport motor 26a, which serves as the power source of a variety of components disposed along the recording-sheet transport pathway, is started in S50.

Next, it is judged in S52 whether or not image data of the first page of the document is stored in the memory 71. If not (S52: NO), then the routine waits until the image data is stored. On the other hand, if image data of the first page of the document is stored in the memory 71 (S52: YES), then in S54 the recording-sheet-supply roller 51a is driven to draw in a recording sheet. In S56 the recording portion 26 is driven to form an image on the recording sheet. While a page is being recorded in S56, it is judged in S58 whether or not the operations for recording the page image on the present recording sheet are almost finished. The judgment of S58 is determined by judging whether or not a time duration of Tr6 seconds has elapsed since the start of recording. The time duration of Tr6 seconds is set to slightly shorter than the time duration equal to the length of the recording sheet divided by the speed at which the recording sheet is transported along the recording-sheet transport pathway. In the present example, Tr6 seconds is 3.0 seconds, which is 0.5 seconds shorter than the time required for recording on A4-sized sheet, with length of 294 mm, transported at a speed of 14 pages per minute (ppm). Recording operations are continued until Tr6 seconds elapse (S58:YES).

Once Tr6 seconds elapse (S58:YES), then it is judged in S60 whether a "data exists" flag or a "no data" flag is set. If not (S60:NO), then it is judged in S62 whether or not image data for the next page of document is stored in the memory 71. If so (S62: YES), then the "data exists" flag is set in S64. If not (S62: NO), then the "no data" flag is set in S66. If a flag is judged to already be set (S60:YES), or if a flag is set in either S64 or S66, then it is judged in S68 whether or not recording on the present recording sheet has been completed. The judgment of S68 is determined by judging whether or not Tr7 seconds has elapsed since sheet feed of the present recording sheet started. The time duration of Tr7 seconds is determined by dividing the length of the recording sheet by the speed at which the recording sheet is transported along the recording-sheet transport pathway. In the present example, Tr6 seconds is 3.5 seconds because the recording sheet is an A4-sized sheet with length of 294 mm and recording sheets are transported at a speed of 14 pages per minute (ppm).

If Tr7 seconds has not yet elapsed (S68: NO), then S54 to S68 are repeated. Once Tr7 seconds elapses (S68: YES), then whether or not the set flag is the "data exists" flag is judged in S70. If not (S70: NO), then this means that the image data for the next page to be recorded is not stored in the memory 71. Therefore, the flags are reset in S72, drive of the recording-sheet-transport motor 26a is stopped in S74, and the memory mode routine 70c ends.

On the other hand, if it is judged that the "data exists" flag is set (S70: YES), then this means that the image data for the next page worth of image to be recorded is stored in the memory 71. Therefore, the flag is reset in S76, a new recording sheet is drawn in in S54, and the processes are repeated up to S70.

Next, the effects of the present invention will be discussed. During the memory mode, the memory 71 is checked to see if image data for the next page of image to be printed is stored in the memory 71 (S62) directly before recording of a previous image is completed (S58: YES). During the simultaneous retrieval/recording mode, the memory 71 is checked to see if image data for the next image to be printed is stored in the memory 71 (S42) at a timing when recording of a subsequent set of image data is expected to start (S40: YES). When it is judged that the image data for the next image is not stored in the memory 71 (S40: NO), then the recording-sheet-transport motor 26a is stopped (S44) to stop transport of recording sheets. On the other hand, recording sheet transport is continued when it is judged that image data for the next image is stored in the memory 71 (S42: YES).

Accordingly, when image data for the next image to be recorded is stored in the memory 71, then as shown in FIG. 7 even during the simultaneous retrieval/recording mode the facsimile machine 2 smoothly forms images on recording sheets without stopping the recording-sheet-transport motor 26a. When image data for the next image to be recorded is not stored in the memory 71, then the recording-sheet-transport motor 26a is promptly stopped (S44) so that the durability of the facsimile machine 2 is enhanced.

Because the facsimile machine 2 discharges documents and recording sheet at the same time during the simultaneous retrieval/recording mode, the operator is presented with a strong visual impression of copying processes being smoothly performed. The timing of document and recording sheet transport can be adjusted using a simple control process, because transport of recording sheets at the recording portion 26 is started after a predetermined fixed period of time elapses from start of document transport at the scanner portion 22.

While the invention has been described in detail with reference to specific embodiments thereof, it would be apparent to those skilled in the art that various changes and modifications may be made therein without departing from the spirit of the invention, the scope of which is defined by the attached claims. For example, the present invention is not limited to application to a facsimile machine, but could be applied to a copy machine, a printer, or other image forming device. Also, although image data is described in the embodiment as being divided into data from different sheets of a document, the image data can be divided into data sets based on a variety of different unit types, referred to generically as document pages.

What is claimed is:

1. A recording device comprising:
   an image retrieval unit that transports document pages one at a time at an image retrieval speed while retrieving images of the document pages as document image data;
   a memory that stores the document image data retrieved by the image retrieval unit;
   an image forming unit that transports recording sheets at a recording sheet transport speed that is faster than the image retrieval speed, while forming images on the recording sheets using document image data that was retrieved by the image retrieval unit and stored in the memory; and
   a control unit that begins retrieving document image data of a document page from the memory as the image retrieval unit is retrieving document image data of the document page and sends the document image data to the image forming unit at a time determined such that the image retrieval unit completes retrieval of the document page nearly simultaneously with the image forming unit recording the document image data onto a recording sheet, the control unit checking the memory to confirm whether document image data for a next document page is stored in the memory at a timing that is:
      after the image forming unit completes forming an image of a present document page at the recording sheet transport speed; and
      when storage of image data retrieved by the image retrieval unit for the next document page is anticipated to start in the memory.

2. A recording device as claimed in claim 1, wherein the control unit includes a memory mode, the control unit, while in the memory mode, controlling to compress and store each document page worth of document image data retrieved by the image retrieval unit in the memory before controlling the image forming unit to start image formation using the document image data of the document page and checking the memory to confirm whether document image data for a next document page is stored in the memory before the image forming device completes formation of an image of a present document page.

3. A recording device as claimed in claim 1, further comprising a reception unit that receives image data from an external source, the control unit confirming, before the image forming device completes formation of an image of a present document page, whether a next document page of image data from the external source exists in the memory.

4. A recording device as claimed in claim 1, wherein the control unit delays drive of the recording sheet transport unit for recording on a recording sheet by a predetermined delay time from after the document transport unit starts transporting a corresponding document page so that end of recording and image retrieving operations for the corresponding document substantially match, the control unit anticipating that storage of image data retrieved by the image retrieval unit for the next document page is to start in the memory when a margin feed delay elapses after the image forming unit completes forming an image of a present document page, the margin feed delay being slightly longer than a time duration required to transport a document sheet at the document-sheet transport speed by a distance equivalent to a non-image-retrieved margin at a front edge of the document sheet.

5. A recording device with a copy function, the recording device comprising:
   a document transport unit that successively transports document pages one sheet at a time along a document transport pathway at a document page transport speed;
   an image retrieval unit that retrieves images of the document pages transported successively by the document transport unit as document image data;
   a reception unit that receives document image data from an external source;
   a memory unit that stores the document image data received by the reception unit and document image data retrieved by the image retrieval unit into a memory;
   a recording sheet transport unit that transports recording sheets along a recording sheet transport pathway at a recording sheet transport speed that is faster than the document page transport speed;
   an image forming unit that, based on document image data stored in the memory, forms images onto recording sheets transported by the recording sheet transport unit;
   a mode switching unit that selectively switches between:
      a memory mode wherein the memory unit compresses and stores document image data retrieved by the image retrieval unit and received by the reception unit for each document page in the memory before outputting the image data for the document page to the image forming unit, the image forming unit then recording images on the recording sheet based on the document image data; and
      a simultaneous retrieval/recording mode wherein, in order to record images on the recording sheet while retrieving images using the image retrieval unit, the memory unit stores, in the memory, the document image data retrieved for a document page by the image retrieval unit while outputting the document image data for the document page in the memory to the image forming unit at a time determined such that the image retrieval unit completes retrieval of the document page nearly simultaneously with the image forming unit recording the document image data onto a recording sheet;
   a check unit that checks whether document image data for recording an image on a next recording sheet is stored in the memory, the check unit checking:
      before the image forming unit completes recording an image on a present recording sheet during the memory mode; and
      when the memory unit is anticipated to start storing, in the memory, image data retrieved by the image retrieval unit for the next document page during the simultaneous retrieval/recording mode; and
   a transport control unit that stops the recording sheet transport unit when the check unit judges that the memory does not store document image data of the next document page and continues operation of the recording sheet transport unit to transport the next recording sheet when the check unit judges that the memory stores document image data of the next document page.

6. A recording device as claimed in claim 5, further comprising a sheet discharge adjustment unit that, during the simultaneous retrieval/recording mode, adjusts transport operations of the document transport unit and the recording sheet transport unit so that transport of each document page and corresponding recording sheet are completed at the same time.

7. A recording device as claimed in claim 6, wherein, during the simultaneous retrieval/recording mode, the sheet discharge adjustment unit drives the recording sheet transport unit to start transporting a recording sheet after a predetermined fixed duration of time elapses after the document transport unit starts transporting a corresponding document page.

8. A recording device as claimed in claim 7, wherein, during the simultaneous retrieval/recording mode, the check unit anticipates that the memory unit will start storing image data when a margin feed delay elapses after the image forming unit completes forming an image of a present document page, the margin feed delay being slightly longer than a time duration required to transport a document sheet at the document-sheet transport speed by a distance equivalent to a non-image-retrieved margin at a front edge of the document sheet.

9. A recording device as claimed in claim 5, wherein the recording sheet transport unit includes a photosensitive member, a transport roller, and a fixing unit.

10. A recording device as claimed in claim 1, further comprising a simultaneous retrieval/recording mode wherein, in order to record images on the recording sheet while retrieving images using the image retrieval unit, the memory unit stores, in the memory, the document image data retrieved for a document page by the image retrieval unit while outputting the document image data for the document page in the memory to the image forming unit.

11. A recording device as claimed in claim 10, further comprising a check unit, wherein during the simultaneous retrieval/recording mode, the check unit anticipates that the memory unit will start storing image data when a margin feed delay elapses after the image forming unit completes forming an image of a present document page, the margin feed delay being slightly longer than a time duration required to transport a document sheet at the document-sheet transport speed by a distance equivalent to a non-image-retrieved margin at a front edge of the document sheet.

12. The recording device as claimed in claim 1, wherein the control unit sends the document image data to the image forming unit at a time determined such that the image forming unit completes recording of the document image data onto a recording sheet at a time between a time when the image retrieval unit completes retrieval of the document page and a scheduled time for the image retrieval unit to start retrieving a next document page.

13. The recording device as claimed in claim 5, wherein in the simultaneous retrieval/recording mode the memory unit outputs the document image data for the document page in the memory to the image forming unit at a time determined such that the image forming unit completes recording of the document image data onto a recording sheet at a time between a time when the image retrieval unit completes retrieval of the document page and a scheduled time for the image retrieval unit to start retrieving a next document page.

* * * * *